US007011907B2

(12) United States Patent
Noguchi et al.

(10) Patent No.: US 7,011,907 B2
(45) Date of Patent: Mar. 14, 2006

(54) SECONDARY BATTERY CATHODE ACTIVE MATERIAL, SECONDARY BATTERY CATHODE AND SECONDARY BATTERY USING THE SAME

(75) Inventors: Takehiro Noguchi, Tokyo (JP); Tatsuji Numata, Tokyo (JP); Daisuke Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 382 days.

(21) Appl. No.: 10/302,938

(22) Filed: Nov. 25, 2002

(65) Prior Publication Data

US 2004/0202938 A1 Oct. 14, 2004

(30) Foreign Application Priority Data

Nov. 27, 2001 (JP) ............................ 2001-361283

(51) Int. Cl.
*H01M 4/50* (2006.01)
*H01M 4/52* (2006.01)
*C01G 53/04* (2006.01)
*C01G 45/12* (2006.01)

(52) U.S. Cl. .................. 429/223; 429/224; 429/231.1; 429/231.9; 423/594.4; 423/594.6

(58) Field of Classification Search ................ 429/223, 429/224, 231.1, 231.6, 231.9; 423/594.4, 423/594.6
See application file for complete search history.

(56) References Cited

U.S. PATENT DOCUMENTS

| | | | | |
|---|---|---|---|---|
| 5,679,481 | A * | 10/1997 | Takanishi et al. | 429/223 |
| 6,037,095 | A * | 3/2000 | Miyasaka | 423/594.4 X |
| 6,337,158 | B1 * | 1/2002 | Nakajima et al. | 423/224 |
| 6,531,220 | B1 * | 3/2003 | Kweon et al. | 429/231.1 X |
| 6,551,743 | B1 * | 4/2003 | Nakanishi et al. | 429/223 |
| 6,814,894 | B1 * | 11/2004 | Shoji et al. | 429/224 X |

FOREIGN PATENT DOCUMENTS

| | | | |
|---|---|---|---|
| JP | 11-312522 | A | 11/1999 |
| JP | 2000-323140 | A | 11/2000 |
| JP | 2000-353526 | A | 12/2000 |
| JP | 2001-48547 | A | 2/2001 |
| JP | 2001-68109 | A | 3/2001 |
| JP | 2001-319653 | A | 11/2001 |
| JP | 2002-216744 | A | 8/2002 |

OTHER PUBLICATIONS

Proceedings of the 41st Battery Symposium, Nov. 20-22, 2000, p. 458.

* cited by examiner

*Primary Examiner*—Stephen J. Kalafut
(74) *Attorney, Agent, or Firm*—Sughrue Mion, PLLC

(57) ABSTRACT

A cathode active material for a lithium-ion secondary battery includes a spinel lithium manganese composite oxide expressed by the general formula: $Li_a(Ni_xMn_{2-x-q-r}Q_qR_r)O_4$, wherein $0.4 \leqq x \leqq 0.6$, $0<q$, $0 \leqq r$, $x+q+r<2$, $0<a<1.2$, Q is at least one element selected from the group consisting of Na, K and Ca, and R is at least one element selected from the group consisting of Li, Be, B, Mg and Al.

14 Claims, 1 Drawing Sheet

SECONDARY BATTERY CATHODE ACTIVE MATERIAL, SECONDARY BATTERY CATHODE AND SECONDARY BATTERY USING THE SAME

BACKGROUND OF THE INVENTION (a) Field of the Invention

The present invention relates to a cathode active material for a secondary battery and, more particularly, to a cathode active material for a secondary battery, which includes a spinel-structure lithium manganese composite oxide exhibiting a 5-volt-class operational potential and having a large discharge capacity.

(b) Description of the Related Art

Lithium-ion secondary batteries are widely used for portable data-processing terminals such as personal computers and mobile telephones. There has been a technical subject such that the secondary batteries should have smaller dimensions and a lower weight, and the current important technique subject is that the secondary batteries should have a higher energy density.

There are some conceivable techniques for increasing the energy density of the lithium-ion secondary battery. Among other techniques, it is considered highly effective to raise the operational potential of the lithium-ion secondary battery. In the conventional lithium-ion secondary batteries using lithium cobalt oxide or lithium manganese oxide as a cathode active material, the operational potential of the cathode against a lithium reference electrode is limited to a 4-volt class, i.e., around 4 volts or between 3.6 and 3.8 volts at the average operational potential. This limit of the operational potential results from the fact that the appeared potential is limited by the oxidation and reduction reactions of cobalt ions or manganese ions such as "$Co^{3+} \Leftrightarrow Co^{4+}$" or "$Mn^{3+} \Leftrightarrow Mn^{4+}$".

On the other hand, it is known that a spinel compound wherein Mn in the lithium manganese oxide is substituted by Ni etc., if used as the active material, can achieve an operational potential of 5-volt class, i.e., as high as around 5 volts. More specifically, use of the spinel compound such as $LiNi_{0.5}Mn_{1.5}O_4$ as the cathode active material provides a potential plateau in the range above 4.5V. In such a spinel compound, Mn exists in the form of tetra-valence, wherein operational potential is defined by the oxidation and reduction reactions of $Ni^{2+} \Leftrightarrow Ni^{4+}$ which replaces the oxidation and reduction reactions of $Mn^{3+} \Leftrightarrow Mn^{4+}$.

However, even the energy density of the spinel compound of $LiNi_{0.5}Mn_{1.5}O_4$ etc. does not significantly exceed the energy density of $LiCoO_2$ heretofore, and accordingly, a substance for the active material having a further higher energy density and a further higher storage capacity has been desired.

In addition, the spinel compound such as $LiNi_{0.5}Mn_{1.5}O_4$ suffers from the problems such as reduction in the discharge capacity after iterative charge and discharge cycles and degradation of the crystal structure at a higher temperature range, and these problems should also be removed.

It is noted that the technique of replacing manganese and oxygen by other metals has been often used in the 4-volt-class active materials. For example, Patent Publications JP-A-11-312522 and -2001-48547, some of manganese in lithium manganese oxide is substituted by nickel while introducing metals such as boron for improving the cycle characteristics and preservability of the battery at a higher temperature. The purpose of the substitution in the present invention, however, differs from the purpose of the substitution in the 4-volt-class active material.

In JP-A-2001-48547, the substitution of some of Mn by another element is conducted for the purpose of suppressing the reduction of the storage capacity due to the crystal distortion in the manganese oxide caused by iterative operation. It is recited in this publication that the amount of substitution should be maintained below a specified value for avoiding reduction of the storage capacity caused by the reduction of the tri-valent Mn. It is recited in JP-A-2001-48547 that, in the technique wherein some of Mn is substituted by lithium, some of the lithium is replaced by bi- or tri-valent other metals for suppressing the reduction of the tri-valent Mn to thereby prevent the reduction of the storage capacity. In particular, the valence of Mn is defined at 3.635 or lower in JP-A-11-312522. More specifically, the substitution of Mn in the conventional cathode active material of 4-volt class is effected while suppressing the valence of Mn at a lower value for maintaining the storage capacity. In these publications, in view that the operational potential of the active material is defined by the valence change of manganese, tri-valent manganese should remain at a specified amount in the active material, and thus the molecular ratio of nickel in the active material is in general 0.1 or below.

SUMMARY OF THE INVENTION

In view of the above problems in the conventional technique, it is an object of the present invention to provide a cathode active material for a cathode of a lithium-ion secondary battery, which is capable of suppressing degradation of reliability, such as degradation of the crystal structure, and achieving a high operational voltage of the secondary battery.

The present invention provides, in a first aspect thereof, a cathode active material for a lithium-ion secondary battery, including a spinel lithium manganese composite oxide having the general formula (I):

$$Li_a(Ni_xMn_{2-x-q-r}Q_qR_r)O_4 \quad (I)$$

wherein $0.4 \leqq x \leqq 0.6$, $0<q$, $0 \leqq r$, $x+q+r<2$, $0<a<1.2$, Q is at least one element selected from the group consisting of Na, K and Ca, and R is at least one element selected from the group consisting of Li, Be, B, Mg and Al.

In accordance with the cathode active material of the first aspect of the present invention for a lithium-ion secondary battery, the ratio of nickel component residing between 0.4 and 0.6 allows the operational potential of the active material to assume 4.5 volts or above, because this range of the nickel component allows the $Mn^{3+}$ component to substantially entirely disappear in the spinel lithium manganese composite oxide, whereby the operation potential is defined by Ni and not by Mn. An excessively higher nickel component ratio, however, rather reduces the operational potential, and accordingly, the nickel component ratio should be preferably equal to or lower than 0.6.

In the cathode active material of the present invention, the ratio of the nickel component which is equal to or above 0.4 substantially entirely removes the $Mn^{3+}$ component to improve the cycle characteristics of the secondary battery at a higher temperature. It is to be noted that if the $Mn^{3+}$ component remains in the spinel structure of the lithium manganese composite oxide, the $Mn^{3+}$ component induces a disproportion reaction due to free acid (hydrofluoric acid, for example) in the electrolytic solution, such as follows:

$$2Mn^{3+} \rightarrow Mn^{2+} + Mn^{4+}.$$

The $Mn^{2+}$ ions thus generated are dissolved in the electrolytic solution. These $Mn^{2+}$ ions may be then precipitated on the surfaces of the separator or anode carbon of the secondary battery to raise a factor for impeding the charge and discharge operation of the battery. In the present invention, the ratio of nickel component equal to above 0.4 removes the $Mn^{+3}$ component to suppress the problem, whereby excellent cycle characteristics can be obtained at the higher temperature.

The present invention also provides, in a second aspect thereof, a cathode active material for a lithium-ion secondary battery, including a spinel lithium manganese composite oxide having the general formula (II):

$$Li_a(Ni_xMn_{2-x-y-z}Y_yA_z)(O_{4-w}Z_w) \quad \text{(II)}$$

wherein 0 4≦x≦0.6, 0<y, 0≦z, x+y+z<2, 0<a<1.2, 0<w<1, Y is at least one element selected from the group consisting of Be, B, Na, Mg, Al, K, and Ca, A is at least one element selected from the group consisting of Ti and Si, and Z is at least one element selected from the group consisting of F and Cl.

As described above, the ratio of nickel component residing between 0.4 and 0.6 achieves an operational potential of 5-volt class, improves the cycle characteristics at a higher temperature, and achieves a higher energy density of the battery. In the present invention, some of the manganese component is substituted by a metal having a lower weight than manganese to raise the energy density of the battery. In the general formulae (I) and (II), each of given Q, R and Y is a metal replacing the manganese, has a mono- to tri-valence, and is selected from metals having lower weights than manganese. More specifically, each of Q, R and Y in the formulae is at least one element selected from the group consisting of Li, Be, B, Na, Mg, Al, K, and Ca. Such a substituting metal prevents the valence change of Mn to achieve a higher operational potential and a lower weight of the cathode, whereby the storage capacity per unit weight of the battery is improved.

In accordance with the cathode active material of the second aspect of the present invention, since both manganese and oxygen are substituted, several advantages can be obtained in addition to the advantage of the higher energy density in the secondary battery, as detailed below.

In general, if some of manganese is substituted by a mono- to tri-valent metal Q, R or Y as in the formulae (I) and (II), then $Ni^{2+}$ is likely to be converted to $Ni^{3+}$. This is because when tetra-valent Mn is substituted by a tri- or less-valent metal Q, R or Y, the valence of Ni is more likely to increase for maintaining the total valence within the compound. After $Ni^{2+}$ is converted into $Ni^{3+}$, the component in the active material, which contributes to the charge and discharge operation of the battery, is reduced to thereby lower the storage capacity thereof.

In the present invention, however, some of oxygen is also substituted by Z for suppressing such a reduction of the storage capacity. More specifically, since oxygen has negative bi-valence and Z has a negative mono-valence in this substitution, the valence of Ni component does not increase although the manganese component is substituted by the metal Y having a mono- to tri-valence, whereby the total valence within the compound as a whole is maintained at zero. Thus, the reduction of the storage capacity due to the valence change of the Ni component which is generally caused by substitution of Mn by another lower-weight metal is effectively suppressed by the substitution of oxygen by the element Z.

Moreover, the metals Ti and Si in the formula (II) have lower weights than Mn and are superior to Mn in the chemical stability. After the substitution of Mn by Ti and/or Si, the compound has a lower weight, and achieves an improvement of the energy density per unit weight.

In the cathode active material of the present invention, the ratio of nickel component residing at 0.4 or above achieves a higher operational potential of 5-volt class due to removal of tri-valent manganese, and also achieves a higher energy density as well as improvement of cycle characteristics at a higher temperature. Thus, the substitution in the active material of the present invention solves the inherent problem for the active material to realize a 5-volt-class operational potential, differently from the substitution in the conventional 4-volt-class cathode active materials.

More specifically, the substitution is effected to the Mn elements and O elements, which are not involved in the charge and discharge operation, in the 5-volt-class spinel lithium manganese composite oxide to reduce the weight of the active material, whereby the discharge current per unit weight is increased to achieve a higher storage capacity.

The present invention also provides a cathode having the cathode active material of the present invention as described above, as well as a secondary battery which includes the cathode having the cathode active material and an anode disposed opposite to the cathode with an intervention of an electrolytic solution. The secondary battery thus provided has a higher energy density per unit weight and excellent cycle characteristics at a high temperature.

BRIEF DESCRIPTION OF THE DRAWING

Single FIGURE is a sectional view of a lithium-ion secondary battery according to an embodiment of the present invention.

PREFERRED EMBODIMENTS OF THE INVENTION

Figure 1:
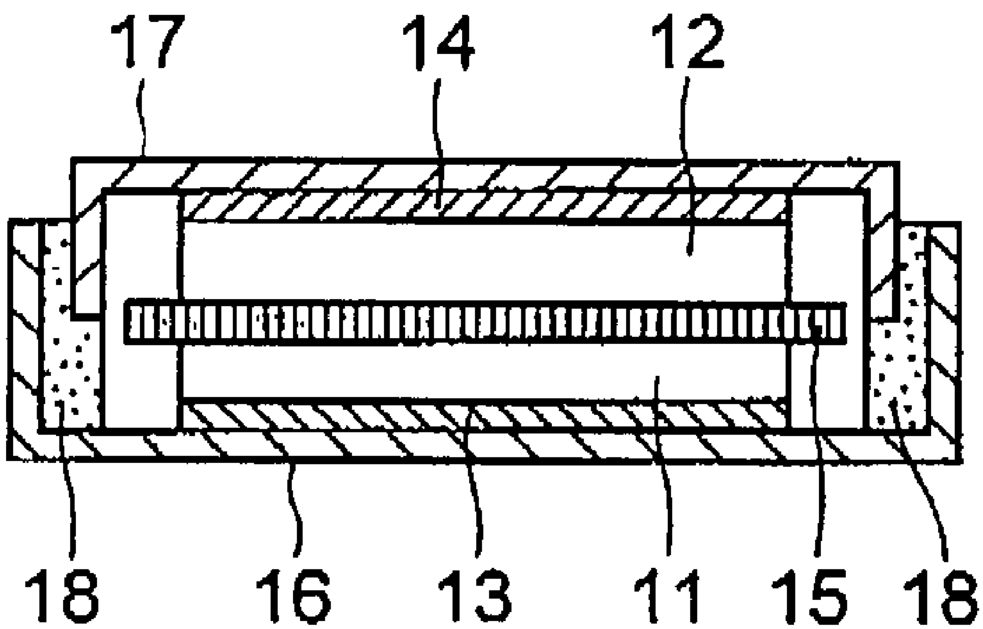

Now, the present invention is more specifically described based on preferred embodiments thereof.

In the cathode active material of the present invention, each of the component ratios q, r and y of elements Q, R and Y in the general formulae (I) and (II) is positive, and the component ratio y in formula (II) is preferably equal to or above 0.05. The preferable component ratio y recited herein achieves a more significant improvement in the energy density per unit weight of the secondary battery.

Each of the elements Q, R and Y should be at least one mono- to tri-valent element having a stability and selected from elements each having a weight lower than Mn. More specifically, examples of each element Q, R or Y include Li, Be, B, Na, Mg, Al, K and Ca. Among these elements, at least one element selected from the group consisting of Li, Mg and Al is especially suited for the active material, because these metals suppress reduction of the discharge capacity and effectively increase the energy density per unit weight.

In the present invention, the theoretical value for the valence of Mn in the spinel lithium manganese composite oxide is preferably equal to or above 3.8, and more preferably equal to or above 3.9. The preferable values of the valence maintain the operational potential of the active material at a higher value with more stability, and prevent elusion of Mn into the electrolytic solution, thereby suppressing reduction of the discharge capacity after iterative operation.

The term "theoretical value for the valence of Mn" means a value calculated based on the valences and the component ratios of constituent elements other than Mn in the spinel compound. For example, the total valence of each of the compounds expressed by the general formulae (I) and (II) should be made zero by using the valences of the substituting elements Q, R, Y, A and Z as well as the valences of negative bivalence (−2) of oxygen, mono-valence of Li and bivalence of Ni. If the theoretical valence number of Mn is higher than four, the valence of Ni generally increases for achieving zero total valence, which is undesirable however because the storage and discharge capacity of the battery reduces due to the increase of the valence of Ni.

Substitution of Mn by elements Q, R and Y in the formulae (I) and (II) and further substitution of O by F and/or Cl in the formula (II) allows the molecular weights of the cathode active materials expressed by the formulae (I) and (II) to be reduced. If Mn is substituted by other elements to change the valence of Ni, then the capacity per unit weight of the cathode active material will be reduced. Accordingly, the substitution of O by element Z in the formula (II) should be such that the amount of substitution does not cause the valence change of Ni. When Li is inserted in the spinel, i.e., the battery is in the discharged state, Ni should have bi-valence, and the relationship between the substituted amount z of O and the substituted amount y of Mn should be:

$$(4-n)y\times0.8<z<(4-n)y\times1.2,$$

wherein n is the valence of the element substituting Mn. The ideal relationship between y and z is $z=(4-n)y$. It is to be noted that substituting element Y is not limited to a single element and the relationship depends on the species and amount of the substituting element or elements Y. If the above relationship of the substituted amount is maintained, the amount of movable Li is maintained at a constant before and after substitution and the total weight can be reduced, whereby a higher discharge capacity per unit weight can be obtained without degrading the high reliability. As a result of examination, the spinel lithium manganese composite oxide after the substitution exhibited a discharge capacity above 130 mAh/gramm and a high reliability.

The resultant battery has an excellent characteristic of energy density due to the 5-volt-class spinel, wherein the high discharge capacity is obtained by substituting Mn by at least on element having a lower weight than Mn and a mono- to tri-valence and by substituting O by F and/or Cl, and wherein charge and discharge for the Li metal is conducted at a higher voltage as high as 4.5 volt or above.

The lithium-ion secondary battery of the present invention includes a cathode having a lithium-containing metallic composite oxide as a cathode active material, and an anode having an anode active material having a lithium-occluding and -releasing function, as main constituent members. The lithium-ion secondary battery also includes a separator sandwiched between the cathode and the anode for insulation therebetween, and an electrolytic solution having a lithium-ion conductivity, in which the cathode and the anode are dipped. These constituent members are encapsulated in a battery case.

In a charge operation of the lithium-ion secondary battery, a voltage is applied between the cathode and the anode, to desorb lithium ions from the cathode active material and to allow the anode active material to occlude the lithium ions, whereby the secondary battery becomes in a charged state. In a discharge operation, the cathode and the anode are electrically contacted together outside the battery to cause a reverse reaction, wherein the lithium ions are released from the anode active material to allow the cathode active material to occlude the lithium ions.

The process for manufacturing the cathode active material of the present invention will be described hereinafter. The raw materials of the cathode active material include Li sources such as $Li_2CO_3$, LiOH, $Li_2O$ and $Li_2SO_4$. Among them, $Li_2CO_3$ and LiOH are more preferable. The raw materials also include Mn sources including a variety of Mn oxides, such as electrolytic manganese dioxide (EMD), $Mn_2O_3$, $Mn_3O_4$ and CMD, and $MnCO_3$, $MnSO_4$ etc. The raw materials also include nickel sources such as NiO, $Ni(OH)_2$, $NiSO_4$ and $Ni(NO_3)_2$.

The source materials for the substituting element include oxides, carbonates, hydroxides, sulfides, nitrates of the substituting element. The source material for Ni, Mn, or the substituting element may cause a difficulty in element diffusion during baking of the source material, whereby a Ni oxide, Mn oxide, carbonate oxide or nitrate oxide may remain as a heterogeneous phase after the baking of the source material. This is avoided by dissolving-mixing the source materials of Ni and Mn, or the source materials of Ni, Mn and the substituting element, together within an aqueous solution, and by using the mixture of Ni and Mn or the mixture of Ni, Mn and the substituting element which is precipitated in the form of hydroxide, sulfate, carbonate, or nitrate after the dissolving-mixing. Such a mixture may be baked to obtain the mixed oxides of Ni and Mn or mixed oxides of Ni, Mn and the substituting element. Use of such a mixture as the source materials alleviates the difficulty in the introduction of Ni or the substituting element into the 16d site of the spinel structure, because Ni, Mn and the substituting element are well mixed together at the atomic level thereof.

Each of the F source and Cl source in the cathode active material may be a fluoride or chloride of the substituting metallic element, such as LiF or LiCl.

Those materials should be mixed after measuring the weights thereof for achieving a desired component ratio. The mixing of the source materials may be milling-mixing using a ball mill or jet mill. The mixed powder may be baked in an atmospheric or oxygen ambient at a temperature between 600 and 950 degrees C. to obtain the cathode active material. A higher temperature is more preferable as the baking temperature for diffusing each element; however, an excessively higher temperature causes oxygen deficiency to degrade the battery characteristics. In view of this, the baking temperature should be preferably between 700 and 850 degrees C.

The lithium metal composite oxide thus obtained has preferably a specific surface area equal to or below 3 $m^2$/gramm and more preferably equal to or below 1 $m^2$/gramm. A larger specific surface area necessitates a larger amount of binder agent to be used, thereby degrading the energy density per unit weight of the cathode.

The cathode active material as obtained above is mixed with a conductive agent, and the resultant mixture is attached onto a collector by using a binding agent. Examples of the conductive agent include a carbon material, metallic material such as Al, and a powdery conductive oxide. Examples of the binding agent include polyfluoridevinylidene. Examples of the material for the collector include a metallic film including Al as a main component thereof.

The additive amount of the conductive agent may be preferably 1 to 10 wt %, and the additive amount of the binding agent may be preferably 1 to 10 wt %. A lower amount of additive agent is preferable because a larger weight ratio of the active material increases the energy density per unit weight. However, an excessively lower amount of the conductive agent or binding agent causes an insufficient conductivity or peel-off of the electrode, which is undesirable.

Examples of the electrolytic solution in the present invention include at least one of the following compounds, as a single substance or in a combination thereof: ring carbonate group such as propylene carbonate (PC), ethylene carbonate (EC), butylene carbonate (BC) and vinylene carbonate (VC); chain carbonate group such as dimethyl carbonate (DMC), diethyl carbonate (DEC), ethylmethyl carbonate (EMC) and dipropyl carbonate (DPC); aliphatic carboxylic acid ester group such as methyl formate, methyl acetate and ethyl propionate; γ-lactone group such as γ-butylolactone; chain ether group such as 1,2-ethoxyethane (DEE) and ethoxymethoxyethane (EME); ring ether group such as tetrahydrofurane and 2-methyltetrahydrofurane; and other non-proton organic solvents such as dimethylsulfoxide, 1,3-dioxolane, formaldehyde, acetamide, dimethylformaldehyde, dioxolane, acetonitrile, propylnitorile, nitromethane, ethylmonogreim, phosphoric triester, trimethoxymethane, dioxolane derivatives, sulfolane, methylsulfolane, 1,3-dimethyl-2-imidazolidinone, 3-methyl-2-oxozolidinone, propylene carbonate derivatives, tetrahydrofurane derivatives, ethylether, 1,3-propanesultone, anisole N-methylpyrolidone, and fluoridecarboxylic ester. Among these compounds, propylene carbonate, ethylene carbonate, γ-butylolactone, dimethyl carbonate, diethyl carbonate and methyl carbonate are preferably used as a single substance or in a combination thereof.

Lithium salt is dissolved in the organic solvents as described above. Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, lower aliphatic lithium carboxynates, lithium chloroborane, lithium tetraphenylbornate, LiBr, LiI, LiSCN, LiCl, and imides. A polymer electrolyte may be used instead of the above electrolytic solutions. For example, the concentration of the electrolyte may be between 0.5 to 1.5 mol/litter. A higher concentration of the electrolyte increases the density and the viscosity of the electrolytic solution, whereas a lower concentration lowers the electric conductivity.

Examples of the anode active material for occluding and releasing lithium include at least one of a carbon material, Li metal, Si, Sn, Al, SiO and SnO, which may be used as a single substance or in combination thereof.

The anode active material is attached onto the collector by using additive conductive agent and binding agent. Examples of the conductive agent include a carbon material and a powdery conductive oxide. Examples of the binding agent include polyfluoridevinylidene. The collector may be a metallic film including Al or Cu as a main component thereof.

The lithium-ion secondary battery of the present invention may be manufactured by laminating or winding the cathode and anode layers, with a separator sandwiched therebetween, in a dry air ambient or an inert gas ambient, and encapsulating the laminated or wound layers in a battery can or a flexible film including a resin layer and a metallic film.

Referring to the single FIGURE, a secondary battery of an embodiment of the present invention has a coin-type cell structure. The secondary battery includes a cathode including a cathode active material layer 11 formed on a cathode collector 13 and an anode including an anode active material layer 12 formed on an anode collector 14, both the cathode and anode opposing each other to sandwich therebetween a separator 15. An anode can 14 is placed on a cathode can 16, with an insulator gasket 18 disposed therebetween, to form the coin-type cell structure receiving therein the cathode and the anode as well as the electrolytic solution. The secondary battery may have any shape and may be of wound type or laminated type. The cell structure may be laminate pack cell, hexahedron cell or cylindrical cell, instead of the coin-type cell.

EXAMPLE 1

Samples of the cathode active material of the present invention including:

$Li(Ni_{0.5}Mn_{1.5})O_4$ as sample 1;
$Li(Ni_{0.5}Mn_{1.4}Al_{0.1})(O_{3.9}F_{0.1})$ as sample 2;
$Li(Ni_{0.5}Mn_{1.3}Al_{0.2})(O_{3.8}F_{0.2})$ as sample 3;
$Li(Ni_{0.5}Mn_{1.4}Mg_{0.1})(O_{3.8}F_{0.2})$ as sample 4;
$Li(Ni_{0.5}Mn_{1.5})O_4$ as sample 5;
$Li(Ni_{0.5}Mn_{1.4}Al_{0.1})O_4$ as sample 6:
$Li(Ni_{0.5}Mn_{1.41}Al_{0.09})(O_{3.3}F_{0.1})$ as sample 7;
$Li(Ni_{0.5}Mn_{1.4}Al_{0.05})(O_{3.95}F_{0.05})$ as sample 8;
$Li(Ni_{0.5}Mn_{1.4}Al_{0.1})(O_{3.9}F_{0.1})$ as sample 9;
$Li(Ni_{0.5}Mn_{1.3}Al_{0.2})(O_{3.8}F_{0.2})$ as sample 10;
$Li(Ni_{0.5}Mn_{1.4}L1_{0.1})(O_{3.7}F_{0.3})$ as sample 11;
$Li(Ni_{0.5}Mn_{1.45}Mg_{0.05})(O_{3.9}F_{0.1})$ as sample 12;
$Li(Ni_{0.5}Mn_{1.45}Na_{0.05})(O_{3.85}F_{0.15})$ as sample 13;
$Li(Ni_{0.5}Mn_{1.45}K_{0.05})(O_{3.85}F_{0.15})$ as sample 14;
$Li(Ni_{0.5}Mn_{1.45}Ca_{0.05})(O_{3.9}F_{0.1})$ as sample 15;
$Li(Ni_{0.5}Mn_{1.45}B_{0.05})(O_{3.95}F_{0.05})$ as sample 16;
$Li(Ni_{0.5}Mn_{1.45}B_{0.05})(O_{3.95}Cl_{0.05})$ as sample 17; and
$Li(Ni_{0.5}Mn_{1.45}Be_{0.05})(O_{3.9}F_{0.1})$ as sample 18 and comparative examples were prepared, and subjected to the evaluation as detailed hereinafter. The comparative example of the cathode active material included $Li(Ni_{0.5}Mn_{1.5})O_4$.

The samples 1 to 4 were prepared by measuring the weight of the source materials $MnO_2$, NiO, $Li_2CO_3$, MgO, $Al_2O_3$ and LiF to obtain desired component ratios, milling and mixing these compounds, and baking the mixed powdery compounds at a temperature of 750 degrees C. for 8 hours. Each of the crystal structures of the resultant active materials was confirmed to assume a substantially-single-phase spinel structure.

The samples 5 to 18 were prepared by using mixed composite oxides including Ni, Mn and additive metals as the metal source, measuring the weight of $LI_2Co$, LiF and LiCl to obtain desired component ratios, milling and mixing these compounds, and baking the mixed powdery compounds at a temperature of 700 degrees C. for 8 hours. Each of the crystal structures of the resultant active materials was confirmed to assume a substantially-single-phase spinel structure.

Each of the resultant active materials was then mixed with carbon used as a conductive agent, and dissolved in a solution, wherein polyfluoridevinylidene was dissolved in N-methylpyrolidone, to allow the resultant active material to form a slurry. The cathode active material, the conductive agent and the binding agent were mixed at a weight ratio of 88:6:6 in the recited order. The resultant slurry was coated onto the Al cathode collector, followed by drying the same for twelve hours in a vacuum ambient to obtain an electrode stuff. The electrode stuff was cut to a disk having a diameter of 12 mm, and then subjected to shaping using a thrust pressure of 3 tons/$m^2$ to thereby obtain the cathode. A Li metallic disk was used as the anode. A PP film was used as the separator, which was sandwiched between the cathode and the anode. These members were received in a coin cell, which was filled with an electrolytic solution and sealed. The electrolytic solution was such that electrolyte $LiPF_6$ was dissolved at a rate of 1 mol/litter in a solvent, wherein ethylene carbonate and diethyl carbonate are mixed at a ratio of 3:7 (vol. percent).

The samples of the secondary batteries thus manufactured were subjected to evaluation of battery characteristics. In the evaluation, the secondary batteries were charged at a rate of 0.1 C., i.e., 0.1 (ampere) of the storage capacity of the battery in terms of the ampere-hour, up to a terminal voltage of 4.9 volts, and was discharged at the same rate down to a terminal voltage of 3 volts. As will be understood from the following table, the storage capacity was higher compared to the conventional active material, with the theoretical value for the valence of Mn being substantially equal to or above 3.8 and substantially equal to or less 4.0. It was confirmed that composite oxide used as the source material, as shown by the samples 1 5 in the table, increased the storage capacity. Thus, it was considered that use of the composite oxide allowed Mn. Ni and additive metals to be uniformly distributed to obtain an active material having excellent crystal structure.

TABLE 1

| Sample No. | Compound | Capacity (mAh/g) | Average Operational voltage (volt) | Theoretical valence of Mn |
|---|---|---|---|---|
| 1 | $Li(Ni_{0.5}Mn_{1.5})O_4$ | 130 | 4.6 | 4.00 |
| 2 | $Li(Ni_{0.5}Mn_{1.4}Al_{0.1})(O_{3.9}F_{0.1})$ | 132 | 4.6 | 4.00 |
| 3 | $Li(Ni_{0.5}Mn_{1.3}Al_{0.2})(O_{3.8}F_{0.2})$ | 135 | 4.6 | 4.00 |
| 4 | $Li(Ni_{0.5}Mn_{1.4}Mg_{0.1})(O_{3.8}F_{0.2})$ | 132 | 4.6 | 4.00 |
| 5 | $Li(Ni_{0.5}Mn_{1.5})O_4$ | 133 | 4.6 | 4.00 |
| 6 | $Li(Ni_{0.5}Mn_{1.4}Al_{0.1})O_4$ | 120 | 4.65 | 4.07 |
| 7 | $Li(Ni_{0.5}Mn_{1.41}Al_{0.09})(O_{3.9}F_{0.1})$ | 135 | 4.65 | 3.99 |
| 8 | $Li(Ni_{0.5}Mn_{1.4}Al_{0.05})(O_{3.95}F_{0.05})$ | 137 | 4.65 | 4.00 |
| 9 | $Li(Ni_{0.5}Mn_{1.4}Al_{0.1})(O_{3.9}F_{0.1})$ | 137 | 4.65 | 4.00 |
| 10 | $Li(Ni_{0.5}Mn_{1.3}Al_{0.2})(O_{3.8}F_{0.2})$ | 134 | 4.65 | 4.00 |
| 11 | $Li(Ni_{0.5}Mn_{1.4}Li_{0.1})(O_{3.7}F_{0.3})$ | 136 | 4.65 | 4.00 |
| 12 | $Li(Ni_{0.5}Mn_{1.45}Mg_{0.05})(O_{3.9}F_{0.1})$ | 136 | 4.65 | 4.00 |
| 13 | $Li(Ni_{0.5}Mn_{1.45}Na_{0.05})(O_{3.85}F_{0.15})$ | 135 | 4.65 | 4.00 |
| 14 | $Li(Ni_{0.5}Mn_{1.45}K_{0.05})(O_{3.85}F_{0.15})$ | 135 | 4.65 | 4.00 |
| 15 | $Li(Ni_{0.5}Mn_{1.45}Ca_{0.05})(O_{3.9}F_{0.1})$ | 135 | 4.65 | 4.00 |
| 16 | $Li(Ni_{0.5}Mn_{1.45}B_{0.05})(O_{3.95}F_{0.05})$ | 136 | 4.65 | 4.00 |
| 17 | $Li(Ni_{0.5}Mn_{1.45}B_{0.05})(O_{3.95}Cl_{0.05})$ | 134 | 4.65 | 4.00 |
| 18 | $Li(Ni_{0.5}Mn_{1.45}Be_{0.05})(O_{3.9}F_{0.1})$ | 136 | 4.65 | 4.00 |

EXAMPLE 2

Cycle tests were conducted to sample batteries including the sample cathodes used in the example 1. More specifically, the cathodes of the sample batteries included, as the cathode active materials, $Li(Ni_{0.5}Mn_{1.5})O_4$ (sample 1), $Li(Ni_{0.5}Mn_{1.4}Al_{0.1})(O_{3.9}F_{0.1})$ (sample 2), $Li(Ni_{0.5}Mn_{1.3}Al_{02})(O_{3.8}F_{0.2})$ (sample 3) of the cathode active materials of example 1, which were prepared similarly to the process of example 1. The anode of the sample batteries included graphite as the anode active material, with which carbon is mixed as a conductive agent. The mixture is dispersed in a solution wherein polyfluoridevinylidene was dissolved in N-methylpyrolidone to obtain a slurry. The weight ratio between the anode active material, the conductive agent and the binder agent was 90:1:9 in the recited order. The slurry was applied to a Cu collector by coating, and dried in a vacuum ambient for 12 hours to obtain an electrode stuff. The electrode stuff was cut into a disk having a diameter of 13 mm, and then pressed at 1.5 tons/$cm^2$ for shaping.

A PP (polypropylene) film was used as the separator of the sample battery. The cathode and the anode were disposed to sandwich therebetween the separator in the coin cell, which is filled with an electrolytic solution, to obtain each sample battery. The electrolytic solution as used herein was such that an electrolyte, $LiPF_6$, was dissolved at a concentration of 1 mol/litter into a solvent including ethylene carbonate and diethyl carbonate at a ratio of 3:7 vol. percent.

The sample batteries were evaluated by cycle tests in a thermostatic oven maintained at 20 degrees C. The samples were first charged at a rate of 1 C up to 4.75 volts and subsequently charged at a constant voltage of 4.75 volts. The total time length for the charge was 150 minutes. The sample batteries were then discharged at a rate of 1 C down to 3 volts. These charge and discharge operations were conducted for 500 cycles, and the batteries were then evaluated by the discharge capacity after the 500-cycle operation, which is normalized by the initial discharge capacity. The results of the evaluation are shown in the following table 2. It was confirmed that the cathode active material after the substitution according to the present invention had a higher discharge capacity after the 500-cycle operation.

TABLE 2

| Sample No. | Compound | Capacity (%) |
|---|---|---|
| 1 | $Li(Ni_{0.5}Mn_{1.5})O_4$ | 49 |
| 2 | $Li(Ni_{0.5}Mn_{1.4}Al_{0.1})(O_{3.9}F_{0.1})$ | 55 |
| 3 | $Li(Ni_{0.5}Mn_{1.3}Al_{0.2})(O_{3.8}F_{0.2})$ | 64 |

EXAMPLE 3

The following samples:

$Li(Ni_{0.48}Mn_{1.52})O_4$ as sample 19;

$Li(Ni_{0.48}Mn_{1.51}Na_{0.01})O_4$ as sample 20;

$Li(Ni_{0.48}Mn_{1.51}K_{0.01})O_4$ as sample 21;

$Li(Ni_{0.48}Mn_{1.5}K_{0.01}Al_{0.01})O_4$ as sample 22; and
$Li(Ni_{0.48}Mn_{1.51}Ca_{0.01})O_4$ as sample 23 were prepared by the process as described hereinafter and evaluated in the characteristics thereof.

Samples 19 to 23 were prepared by using mixed composite oxides including Ni, Mn and additive metals as the metal sources, measured in the weight thereof to obtain a desired composition ratio of $Li_2CO_3$, milled and mixed together. The mixed powdery materials were baked at a temperature of 700 degrees C. for 8 hours. Each of the resultant materials was confirmed to have a substantially-single-phase spinel structure. These samples were used to obtain sample batteries of coin cell type similar to the example 1.

The sample batteries were subjected to capacity preservation capability after a specific charge thereof. In this test, each sample is charged at a rate of 01 C up to 4.9 volts, followed by discharging at a rate of 0.1 C down to 3 volts while measuring the discharge capacity. Each sample is then charged at a rate of 0.1 C up to 4.9 volts and stored at this state for two weeks at an ambient temperature of 60 degrees C. After the storage, each sample is discharged again at the same rate down to 3 volts, charged at the same rate up to 4.9 volts, and then discharged at the same rate down to 3 volts. The discharge capacity per unit weight (mAh/g) at the last discharge was measured and normalized by the discharge capacity before the storage. The results are shown in table 3 as a percent discharge capacity after storage (DCAS), which exhibits the capacity preservation capability after charge of the battery.

TABLE 3

| Sample No. | Composition | Discharge capacity | Average discharge voltage | DCAS (%) | Theoretical valence of Mn |
|---|---|---|---|---|---|
| 19 | $Li(Ni_{0.48}Mn_{1.52})O_4$ | 130 | 4.63 | 86 | 3.97 |
| 20 | $Li(Ni_{0.48}Mn_{1.51}Na_{0.01})O_4$ | 131 | 4.64 | 97 | 3.99 |
| 21 | $LI(Ni_{0.48}Mn_{1.51}K_{0.01})O_4$ | 132 | 4.64 | 97 | 3.99 |
| 22 | $Li(Ni_{0.48}Mn_{1.5}K_{0.01}Al_{0.01})O_4$ | 132 | 4.65 | 98 | 4.00 |
| 23 | $Li(Ni_{0.48}Mn_{1.51}Ca_{0.01})O_4$ | 131 | 4.64 | 97 | 3.97 |

As understood from table 3, the cathode active material after the substitution according to the present invention had a larger DCAS, i.e., capacity preservation capability after the charge thereof.

As described above, substitution of Mn by metals having lower weights and substitution of O by F and/or Cl in the 5-volt-class cathode active material including lithium manganese composite oxide according the present invention achieves a significantly higher energy density per unit weight of the cathode active material. In addition, lithium-ion secondary batteries having the cathode active material of the present invention have improved cycle characteristics and improved capacity preservation capability.

Since the above embodiments are described only for examples, the present invention is not limited to the above embodiments and various modifications or alterations can be easily made therefrom by those skilled in the art without departing from the scope of the present invention.

What is claimed is:

1. A cathode active material for a secondary battery comprising a spinel lithium manganese composite oxide expressed by the general formula:

$$Li_a(Ni_xMn_{2-x-q-r}Q_qR_r)O_4,$$

wherein $0.4 \leqq x \leqq 0.6$, $0<q$, $0 \leqq r$, $x+q+r<2$, $0<a<1.2$, Q is at least one element selected from the group consisting of Na, K and Ca, and R is at least one element selected from the group consisting of Li, Be, B, Mg and Al.

2. The cathode active material according to claim 1, wherein R is at least one element selected from the group consisting of Mg and Al.

3. The cathode active material according to claim 1, wherein q+r is above zero and equal to or below 0.3.

4. The cathode active material according to claim 1, wherein Mn in said spinel lithium manganese composite oxide has a theoretical valence of 3.8 or above.

5. The cathode active material according to claim 1, wherein said cathode active material is obtained by baking a mixture of composite oxide of at least one metal other than Li, and a Li source.

6. A cathode comprising the cathode active material according to claim 1, wherein said cathode active material is bound by a binding agent.

7. A secondary battery comprising the cathode according to claim 6, an anode opposing said cathode with an intervention of a separator disposed therebetween.

8. A cathode active material for a secondary battery comprising a spinel lithium manganese composite oxide expressed by a general formula:

$$Li_a(Ni_xMn_{2-x-y-z}Y_yA_z)(O_{4-w}Z_w),$$

wherein $0.4 \leqq x \leqq 0.6$, $0<y$, $0=z$, $x+y+z<2$, $0<a<1.2$, $0<w<1$, Y is at least one element selected from the group consisting of Be, B, Na, Mg, Al, K, and Ca, A is at least one element selected from the group consisting of Ti and Si, and Z is at least one element selected from the group consisting of F and Cl.

9. The cathode active material according to claim 8, wherein Y is at least one element selected from the group consisting of Mg and Al.

10. The cathode active material according to claim 8, wherein y is above zero and equal to or below 0.3.

11. The cathode active material according to claim 7, wherein Mn in said spinel lithium manganese composite oxide has a theoretical valence of 3.8 or above.

12. The cathode active material according to claim 8, wherein said cathode active material is obtained by baking a mixture of composite oxide of at least one metal other than Li, a Li source and a halogen source.

13. A cathode comprising the cathode active material according to claim 8, wherein said cathode active material is bound by a binding agent.

14. A secondary battery comprising the cathode according to claim 13, an anode opposing said cathode with an intervention of an electrolytic solution disposed therebetween.

* * * * *